US012356523B2

(12) United States Patent
Chen

(10) Patent No.: US 12,356,523 B2
(45) Date of Patent: Jul. 8, 2025

(54) DRIVING CIRCUIT FOR POWER SUPPLY LINE CARRIER AND DRIVE METHOD THEREOF

(71) Applicant: Shenzhen Chip-vast Hi-tech Co., Ltd., Guangdong (CN)

(72) Inventor: Lisheng Chen, Guangdong (CN)

(73) Assignee: SHENZHEN CHIP-VAST HI-TECH CO., LTD., Guangdong (CN)

( * ) Notice: Subject to any disclaimer, the term of this patent is extended or adjusted under 35 U.S.C. 154(b) by 122 days.

(21) Appl. No.: 18/132,003

(22) Filed: Apr. 7, 2023

(65) Prior Publication Data

US 2023/0354491 A1 Nov. 2, 2023

(30) Foreign Application Priority Data

Apr. 27, 2022 (CN) ......................... 202210452058.4

(51) Int. Cl.
*H05B 45/3725* (2020.01)
*H05B 45/10* (2020.01)
(Continued)

(52) U.S. Cl.
CPC ......... *H05B 45/3725* (2020.01); *H05B 45/10* (2020.01); *H05B 45/20* (2020.01); *H05B 45/48* (2020.01)

(58) Field of Classification Search
CPC .... H05B 45/3725; H05B 45/10; H05B 45/20; H05B 45/48
See application file for complete search history.

(56) References Cited

U.S. PATENT DOCUMENTS

2014/0001885 A1 1/2014 Xiao et al.
2014/0062322 A1 3/2014 Yu et al.
(Continued)

FOREIGN PATENT DOCUMENTS

CN 103533717 A 1/2014
CN 106211422 A 12/2016
(Continued)

OTHER PUBLICATIONS

Office Action dated Apr. 29, 2024, issued in counterpart China Application No. 202210452058.4, 9 pages.

*Primary Examiner* — Minh Tran
(74) *Attorney, Agent, or Firm* — MUNCY, GEISSLER, OLDS & LOWE, P.C.

(57) ABSTRACT

Disclosed are driving circuit for power supply line carrier and driving method thereof, the driving circuit is applied to driving load to operate, which comprises: a control module, a switching module and a half-voltage generating module; the control module connects to the switching module, applied to outputting control signal to the control switching module to be on or off; the switching module connects with a power supply line, a half-voltage generating module and a load respectively, applied to, when being on, charging the half-voltage generating module with power supply voltage provided by the power supply line and outputting power supply voltage to load; the half-voltage generating module further connects to the load, applied to providing supply voltage to the load when the switching module is off, the load demodulates control signal according to power supply voltage and supply voltage before controlling state thereof according to the control signal.

9 Claims, 5 Drawing Sheets

(51) Int. Cl.
*H05B 45/20* (2020.01)
*H05B 45/48* (2020.01)

(56) References Cited

U.S. PATENT DOCUMENTS

| | | | | |
|---|---|---|---|---|
| 2015/0282260 | A1* | 10/2015 | Hussell | H01L 25/50 438/23 |
| 2018/0183315 | A1* | 6/2018 | Lin | H05B 47/18 |
| 2020/0214108 | A1* | 7/2020 | Huang | H05B 45/10 |
| 2021/0385922 | A1* | 12/2021 | Tsai | H02M 1/10 |

FOREIGN PATENT DOCUMENTS

| | | | |
|---|---|---|---|
| CN | 107734745 | A | 2/2018 |
| CN | 108430140 | A | 8/2018 |
| CN | 109309992 | A | 2/2019 |
| CN | 109905941 | A | 6/2019 |
| CN | 209448931 | U | 9/2019 |
| CN | 110707945 | A | 1/2020 |
| CN | 209949483 | U | 1/2020 |
| CN | 113766696 | A | 12/2021 |
| WO | WO-2020082701 | A1 | 4/2020 |

* cited by examiner

DRIVING CIRCUIT FOR POWER SUPPLY LINE CARRIER AND DRIVE METHOD THEREOF

CROSS-REFERENCES TO RELATED APPLICATIONS

This application claims the priority of Chinese patent application no. 202210452058.4, filed on Apr. 27, 2022, the entire contents of all of which are incorporated herein by reference.

FIELD OF THE APPLICATION

The present application relates to the technical field of driving circuit, in particular to a driving circuit for power supply line carrier and a driving method thereof.

BACKGROUND

In the prior art, a driving circuit for a power supply line carrier has a high voltage power module and a low voltage power module. A high voltage serves as a positive pulse carrier signal and a low voltage serves as a negative pulse carrier signal, while both the high voltage and the low voltage are applied to driving a load to operate, and the load receives the power supply line carrier and demodulates a control signal for controlling an operating state of the load. This enables both sending a control signal and providing a voltage and a driving current required by the load through the power supply line only.

Wherein, the high voltage power module may be an internal AC-DC module or a supply voltage being input externally. There are two main categories of the low voltage power module: one is that the high voltage power module adopts a dividing resistor and a regulator transistor to produce the low voltage required; another is that the high voltage power module adopts a DC-DC step-down circuit to produce the low voltage required. The first category has an advantage of a simpler circuit and a lower cost, but a disadvantage of a larger useless power consumption, while an entire circuit has a problem of an excessive heating temperature. The second category has an advantage of a less useless power consumption, a higher power supply utilization efficiency, and no heat generating in the entire circuit, while a disadvantage thereof is a more complex circuit and a higher cost.

Therefore, the current technology needs to be improved and developed.

BRIEF SUMMARY OF THE DISCLOSURE

According to the defects in the prior art described above, the present application provides a driving circuit for power supply line carrier and a driving method thereof, in order to solve the problem in the prior art that the low voltage power module in the driving circuit for the power line carrier has a heat generation and a higher cost.

The technical solution of the present application to solve the technical problem is as follows:

A driving circuit for the power supply line carrier, applied to driving a load operating, comprising: a control module, a switching module and a half-voltage generating module; wherein the control module connects to the switching module, the control module is applied to outputting a control signal to the switching module, so as to control the switching module to be turned on or off;

the switching module connects with a power supply line, the half-voltage generating module and the load respectively, the switching module is applied to, when being turned on, charging the half-voltage generating module with a power supply voltage provided by the power supply line and outputting the power supply voltage to the load;

the half-voltage generating module further connects to the load, the half-voltage generating module is applied to providing a supply voltage to the load when the switching module is turned off, the load demodulates the control signal according to the power supply voltage and the supply voltage before controlling a state thereof according to the control signal; wherein the supply voltage is half the power supply voltage.

Further, the half-voltage generating module comprises: a first energy storage unit, a second energy storage unit and a charging-and-discharging control unit; wherein, the first energy storage unit connects to the switching module, the charging-and-discharging control unit and the load, respectively;

the second energy storage unit connects to the charging-and-discharging control unit and the load, respectively;

the charging-and-discharging control unit is applied to controlling the first energy storage unit and the second energy storage unit to be charged in series, and applied to controlling the first energy storage unit and the second energy storage unit to be discharged in parallel.

Further, the first energy storage unit comprises: a first capacitor, one end of the first capacitor connects to the switching module, the charging-and-discharging control unit and the load, respectively, another end of the first capacitor connects to the charging-and-discharging control unit.

Further, the second energy storage unit comprises: a second capacitor, one end of the second capacitor connects to the charging-and-discharging control unit, another end of the second capacitor connects to the charging-and-discharging control unit and the load, respectively.

Further, the charging-and-discharging control unit comprises: a first diode, a second diode, and a third diode; wherein, a negative electrode of the first diode connects to the switching module, one end of the first capacitor, and the load, respectively, while a positive electrode of the first diode connects to a negative electrode of the second diode and one end of the second capacitor, respectively;

a positive electrode of the second diode connects to another end of the first capacitor and a negative electrode of the third diode, respectively;

the negative electrode of the second diode further connects to one end of the second capacitor;

a positive electrode of the third diode connects to another end of the second capacitor;

wherein a voltage of the first capacitor is equal to a voltage of the second capacitor when the switching module is turned on; the voltage of the first capacitor is equal to half of a difference of the power supply voltage minus a turned-on voltage of the second diode, when the switching module is turned on;

when the switching module is turned off, the first diode and the third diode are turned on, the second diode is turned off, the supply voltage is equal to the voltage of the first capacitor minus a turned-on voltage of the third diode, or the supply voltage is equal to the voltage of the second capacitor minus a turned-on voltage of the first diode.

Further, the switching module comprises: a first switching transistor, a first end of the first switching transistor connects to the control module, a second end of the first switching transistor connects to the power supply line, and a third end of the first switching transistor connects to the half-voltage generating module and the load, respectively.

Further, the load is an LED light string, the LED light string comprises at least one lamp point, the LED light string controls a color and brightness of the lamp point according to the control signal.

Further, the control module sends out control information for each lamp point in a sequence through the control signal, each of the lamp points acquires a lamp point control signal from a corresponding location of the control signal in a built-in address sequence thereof and controls the color and brightness according to the lamp point control signal.

A driving method applied to the driving circuit for the power supply line carrier stated above, wherein comprising:

the control module outputs the control signal to the switching module, so as to control the switching module to be turned on or off;

when the switching module is turned on, the power supply signal provided by the power supply line charges the half-voltage switching module and powers the load;

when the switching module is turned off, the half-voltage generating module supplies a supply voltage to the load;

the load demodulates the control signal according to the power supply voltage and the supply voltage, and controls a state thereof according to the control signal.

Further, the load is an LED light string, the LED light string comprises at least one lamp point, the LED light string controls a color and brightness of the lamp point according to the control signal;

wherein, the control module sends out control information for each lamp point in a sequence through the control signal, each of the lamp points acquires a lamp point control signal from a corresponding location of the control signal in a built-in address sequence thereof and controls the color and brightness according to the lamp point control signal.

The present application provides a driving circuit for the power supply line carrier and a driving method thereof, the driving circuit for the power supply line carrier is applied to driving a load to operate, comprising: a control module, a switching module and a half-voltage generating module; wherein the control module connects to the switching module, the control module is applied to outputting a control signal to the switching module, so as to control the switching module to be turned on or off; the switching module connects with a power supply line, the half-voltage generating module and the load respectively, the switching module is applied to, when being turned on, charging the half-voltage generating module with a power supply voltage provided by the power supply line and outputting the power supply voltage to the load; the half-voltage generating module further connects to the load, the half-voltage generating module is applied to providing a supply voltage to the load when the switching module is turned off, the load demodulates the control signal according to the power supply voltage and the supply voltage before controlling a state thereof according to the control signal; wherein the supply voltage is half the power supply voltage. The present application outputs a control signal to the switching module by the control module to control the switching module to be turned on or off. When the switching module is turned on, the power supply signal provided by the power supply line charges the half-voltage switching module and powers the load; when the switching module is turned off, the half-voltage generating module supplies a supply voltage to the load; the load demodulates the control signal according to the power supply voltage and the supply voltage, and controls a state thereof according to the control signal. The present application supplies power to the load by the half-voltage generating module when the switching module is powered off, without needing to adopt a dividing resistor and a regulator transistor to generate the low voltage required, or a DC-DC step-down circuit to generate the low voltage required, which avoids a heating issue on a driving circuit, as well as lowering a cost.

BRIEF DESCRIPTION OF THE DRAWINGS

In order to illustrate the embodiments of the present application or the technical solutions in the prior art more clearly, a plurality of accompanying drawings, which are required to be used in the embodiments or the prior art, are briefly described below. Obviously, the drawings in the following description are merely some embodiments of the present application. For a person of ordinary skills in the art, a plurality of other drawings can be obtained according to the present drawings without any inventive effort.

Figure 1:
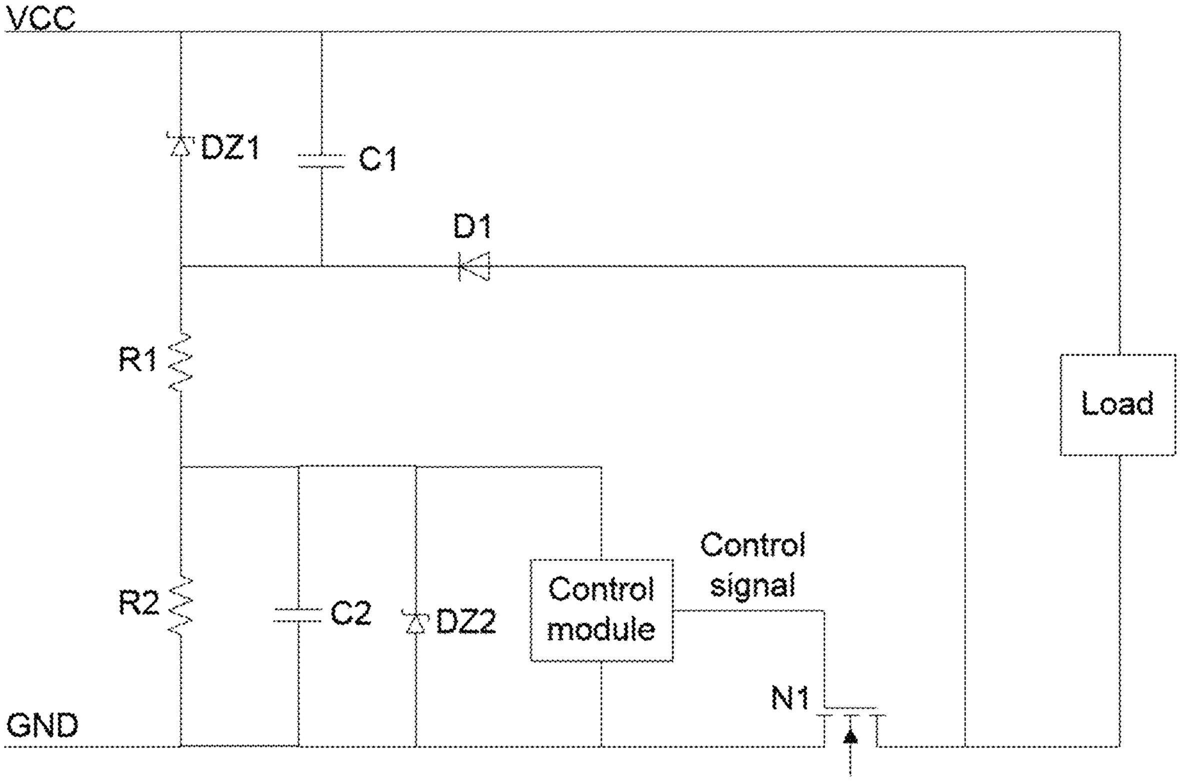
FIG. 1 illustrates a schematic circuit diagram 1 on a conventional driving circuit for a power supply line carrier.

Wherein 100: control module; 200: switching module; 300: half-voltage generating module; 310: first energy storage unit; 320: second energy storage unit; 330: charging-and-discharging control unit; 400: load.

DETAILED DESCRIPTION OF EMBODIMENTS

The present application provides a driving circuit for power supply line carrier and a driving method thereof, in order to make the purposes, technical solutions and the advantages of the present application clearer and more explicit, further detailed descriptions of the present application are stated herein, referencing to the attached drawings and some embodiments of the present application. It should be understood that the detailed embodiments of the application described here are used to explain the present application only, instead of limiting the present application.

In the description and claims, the terms "a," "an," "said," and "the" may include the plural forms as well, unless the article is specifically defined herein. If in the embodiments of the present application there are descriptions referring to "first", "second", etc., such descriptions are applied for descriptive purposes only and are not to be understood as indicating or implying relative importance thereof or as implying designations of the number of technical features indicated. Thus, a feature qualified as "first" and "second" may explicitly or implicitly include at least one such feature.

It should be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It shall be understood that when we refer to an element as being "connected" or "coupled" to another element, it can be directly connected or coupled to the other element or intervening elements may also be present. Further, "connected" or "coupled" as used herein may include wirelessly connected or coupled. As used herein, the term "and/or" includes all or any unit and all combinations of one or more of the associated listed items.

As will be understood by one of ordinary skill in the art, unless otherwise defined, all terms (including technical and scientific terms) used herein have the same meaning as commonly understood by one of ordinary skill in the art to which this application belongs. It should be further understood that terms, such as those defined in commonly used dictionaries, should be interpreted as having a meaning that is consistent with their meaning in the context of the prior art and will not be interpreted in an idealized or overly formal sense unless expressly so defined herein.

In addition, technical solutions between the various embodiments may be combined with each other, but must be based on being able to be realized by a person of ordinary skill in the art, and a combination of technical solutions should be considered to be absent when such combination is contradictory or impossible to be realized, and not within the scope of protection claimed by the present application.

Figure 2:
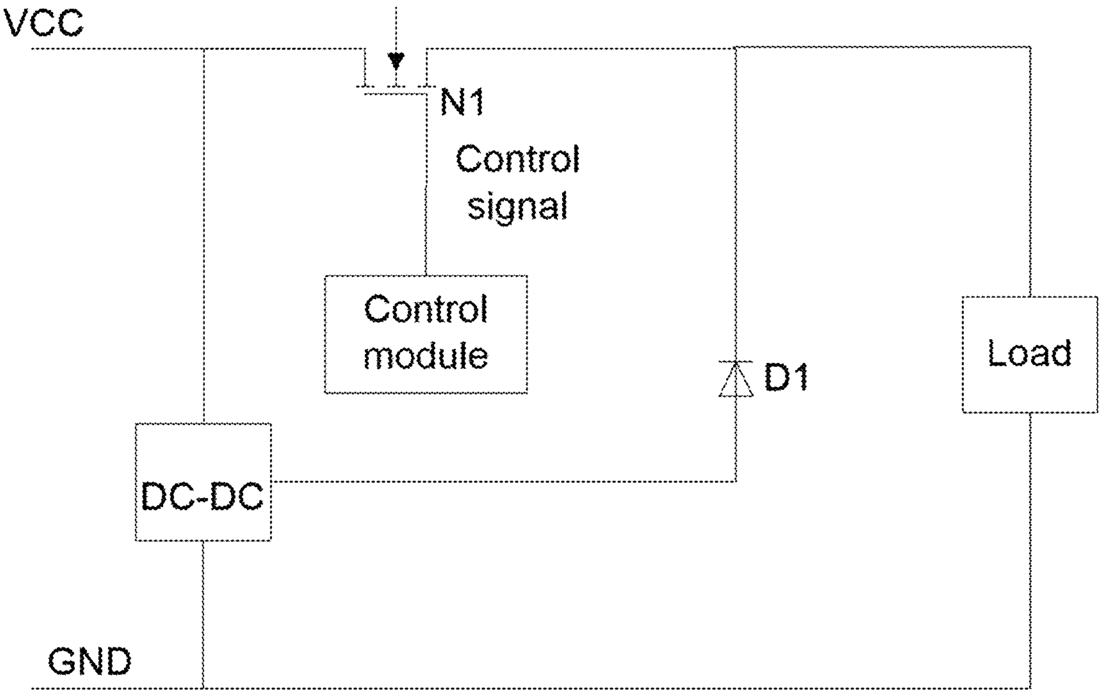
FIG. 2 illustrates a schematic circuit diagram 2 on a conventional driving circuit for a power supply line carrier.

It has been found by the inventors that, the driving circuit for the power supply line carrier in the prior art, there are two main categories of a low voltage power module: one is that a high voltage power module adopts a dividing resistor and a regulator to produce a low voltage required, shown as FIG. 1, separating a low voltage from a high voltage power source VCC for a load to use, the low voltage is generated by a regulator DZ1, and when an NMOS transistor N1 is off, a load current 11 flows to GND through R1, R2 and DZ2; when the NMOS transistor N1 is on, a load current 12 flows directly to GND through N1, while all current of 11 flows to GND through DZ1, R1, R2, and DZ2. In a real application, a turned-on period of N1 is far larger than a turned-off period of N1, thus DZ1, R1, R2, and DZ2 will have a heat generating problem due to having the current 11 passing through for a long period; another is that the high voltage power module adopts a DC-DC step-down circuit to produce the low voltage required, shown as FIG. 2, a low voltage circuit is composed of DC-DC, which is a high efficiency voltage conversion circuit, that solves a circuit heating issue, but it costs too much, which is 8-10 times of the last typical application circuit, having a too low efficiency-cost-ratio to be accepted.

According to the technical problem stated above, the present application provides a driving circuit for the power supply line carrier and a driving method thereof, outputting, by a control module, a control signal to a switching module, so as to control the switching module to be turned on or off. When the switching module is turned on, a power supply signal provided by the power supply line charges a half-voltage generating module, and powers a load; when the switching module is turned off, the half-voltage generating module provides a supply voltage to the load, the load demodulates a control signal according to the power supply voltage and the supply voltage, and controls a state thereof according to the control signal, without needing to adopt a dividing resistor and a regulator transistor to generate the low voltage required, or a DC-DC step-down circuit to generate the low voltage required, which avoids a heating issue on a driving circuit, as well as lowering a cost.

Figure 3:
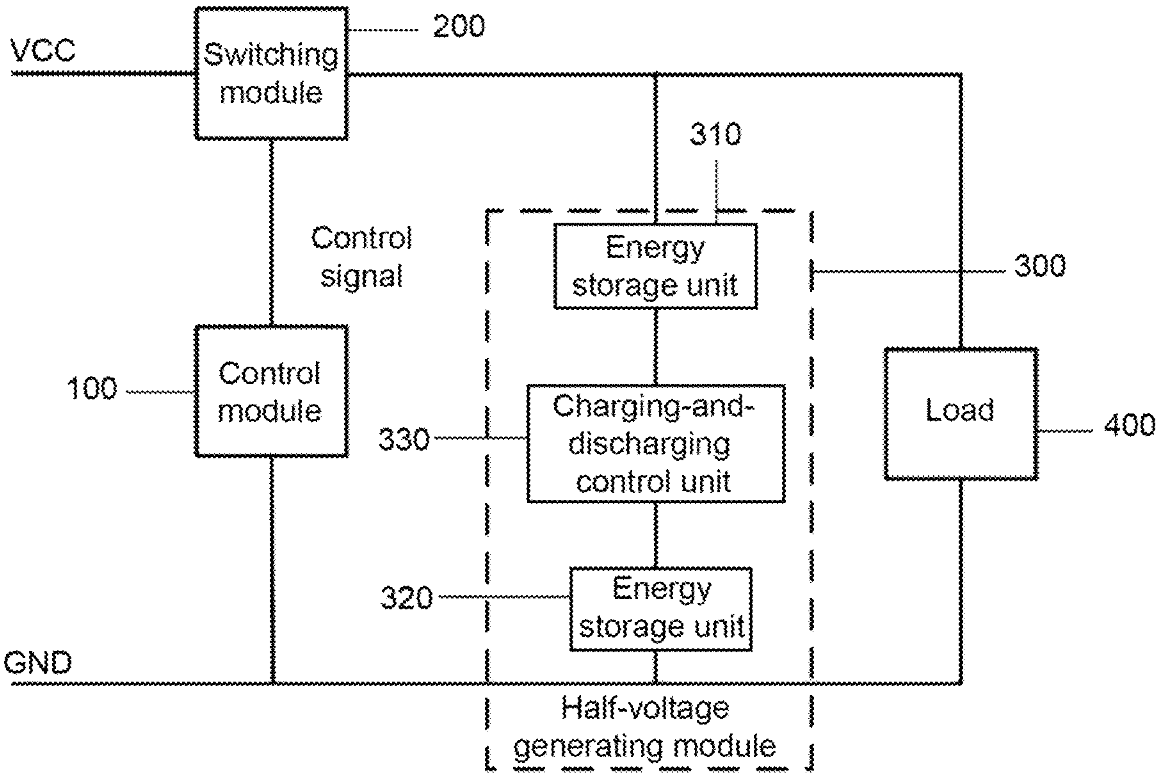
FIG. 3 illustrates a functional block architecture diagram on the driving circuit for the power supply line carrier in the present application.
Figure 7:
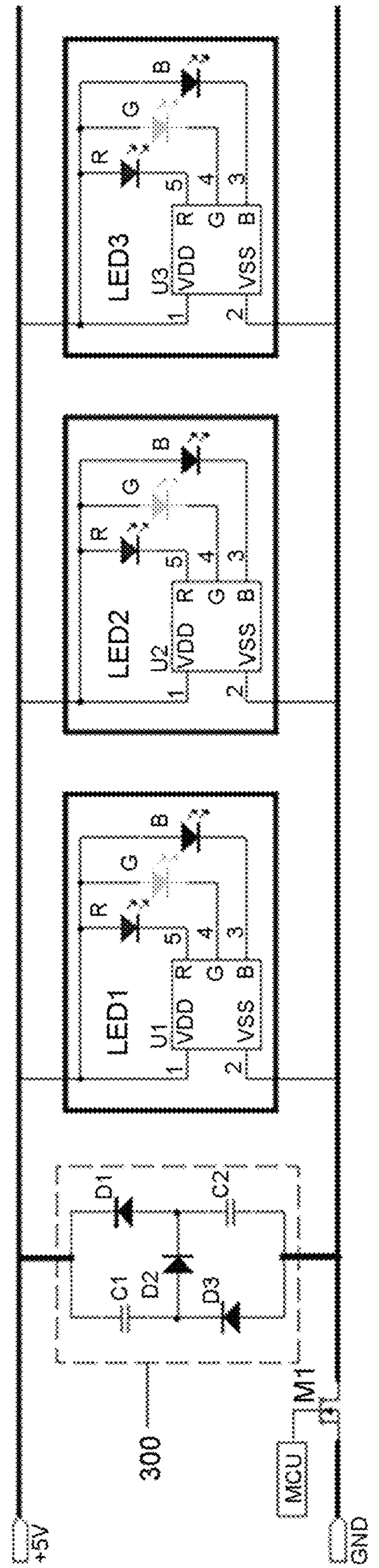
FIG. 7 illustrates a schematic circuit diagram on the driving circuit for the power supply line carrier driving a load of an LED light string having 3 lamp points connected fully in parallel in the present application.

Referencing to FIG. 3 up to FIG. 7 together, the present application provides a preferred embodiment on the driving circuit for the power supply line carrier.

Shown as FIG. 3, the present application provides a driving circuit for the power supply line carrier, applied to driving a load 400 operating, comprising: a control module 100, a switching module 200 and a half-voltage generating module 300; wherein the control module 100 connects to the switching module 200, the control module 100 is applied to outputting a control signal to the switching module 200, so as to control the switching module 200 to be turned on or off; the switching module 200 connects with a power supply line, the half-voltage generating module 300 and the load 400 respectively, the switching module 200 is applied to, when being turned on, charging the half-voltage generating module 300 with a power supply voltage VCC provided by the power supply line and outputting the power supply voltage to the load 400; the half-voltage generating module 300 further connects to the load 400, the half-voltage generating module 300 is applied to providing a supply voltage to the load 400 when the switching module 200 is turned off, the load 400 demodulates the control signal according to the power supply voltage VCC and the supply voltage before controlling a state thereof according to the control signal; wherein the supply voltage is close to half of the power supply voltage VCC.

Specifically, the power supply line connects to the power supply voltage VCC, the switching module 200 connects to the power supply line. The control module 100 is a programmable control unit MCU, the programmable control unit MCU outputs a control signal to the switching module 200, the switching module 200 controls itself to be turned on or off according to the control signal. When the switching module 200 is turned on, the power supply voltage VCC provided by the power supply line charges the half-voltage generating module 300 and outputs to the load 400; when the switching module 200 is turned off, the half-voltage generating module 300 discharges the load 400 and provides a supply voltage to the load 400; the load 400 demodulates the control signal based on the power supply voltage VCC and the supply voltage and controls a state thereof based on the control signal. The present application supplies power to the load 400 by the half-voltage generating module 300 when the switching module 200 is powered off, without needing to adopt a dividing resistor and a regulator transistor to generate the low voltage required, or a DC-DC step-down circuit to generate the low voltage required, which avoids a heating issue on a driving circuit, as well as lowering a cost.

Referencing to FIG. 3, in a further implementation of an embodiment, the half-voltage generating module 300 comprises: a first energy storage unit 310, a second energy storage unit 320 and a charging-and-discharging control unit 330; wherein, the first energy storage unit 310 connects to the switching module 200, the charging-and-discharging control unit 330 and the load 400, respectively; the second energy storage unit 320 connects to the charging-and-discharging control unit 330 and the load 400, respectively; the charging-and-discharging control unit 330 is applied to controlling the first energy storage unit 310 and the second energy storage unit 320 to be charged in series, and applied to controlling the first energy storage unit 310 and the second energy storage unit 320 to be discharged in parallel.

Specifically, when the switching module 200 is turned on, the charging-and-discharging control unit 330 controls the first energy storage unit 310 and the second energy storage unit 320 to be charged in series. When the switching module 200 is turned off, the charging-and-discharging control unit 330 controls the first energy storage unit 310 and the second energy storage unit 320 to be discharged in parallel, that is, controlling the first energy storage unit 310 and the second energy storage unit 320 to provide the supply voltage to the load 400 in a parallel output mode.

Figure 4:
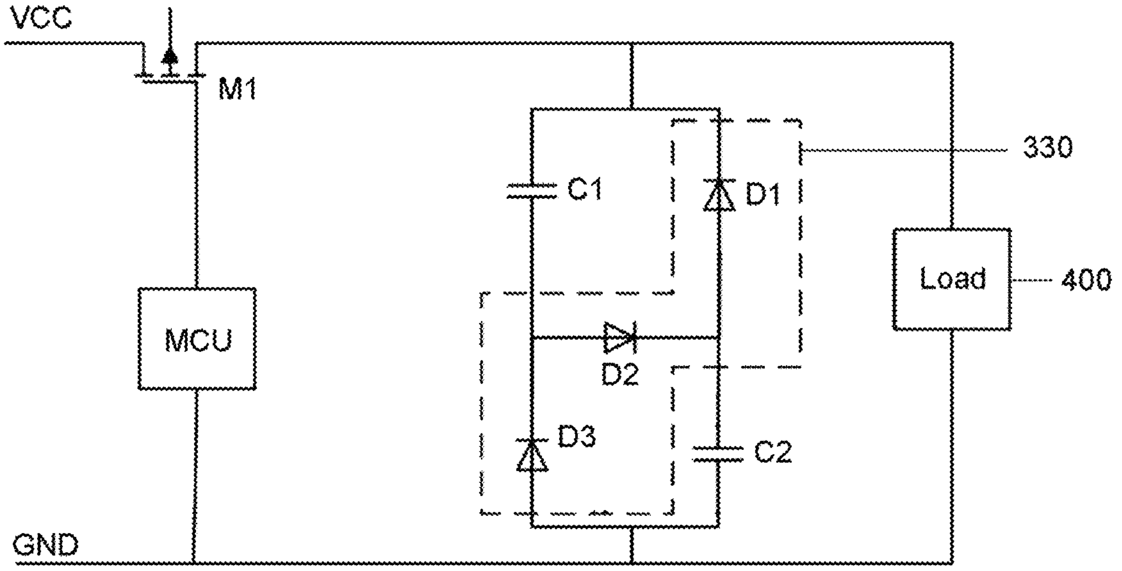
FIG. 4 illustrates a schematic circuit diagram on the driving circuit for the power supply line carrier in one embodiment of the present application.

Continue referencing to FIG. 4, in a further implementation of an embodiment, the first energy storage unit 310 comprises: a first capacitor C1, one end of the first capacitor C1 connects to the switching module 200, the charging-and-discharging control unit 330 and the load 400, respectively, another end of the first capacitor C1 connects to the charging-and-discharging control unit 330. The second energy storage unit 320 comprises: a second capacitor C2, one end of the second capacitor C2 connects to the charging-and-discharging control unit 330, another end of the second capacitor C2 connects to the charging-and-discharging control unit 330 and the load 400, respectively. The charging-and-discharging control unit 330 comprises a first diode D1, a second diode D2, and a third diode D3; wherein, a negative electrode of the first diode D1 connects to the switching module 200, one end of the first capacitor C1, and the load 400, respectively, while a positive electrode of the first diode D1 connects to the negative electrode of the second diode D2 and one end of the second capacitor C2, respectively; a positive electrode of the second diode D2 connects to another end of the first capacitor C1 and a negative electrode of the third diode D3, respectively; the negative electrode of the second diode D2 further connects to one end of the second capacitor C2; a positive electrode of the third diode D3 connects to another end of the second capacitor C2. Wherein a voltage of the first capacitor C1 is equal to a voltage of the second capacitor C2 when the switching module 200 is turned on; the voltage of the first capacitor C1 is equal to half of a difference of the power supply voltage VCC minus a turned-on voltage of the second diode D2, when the switching module 200 is turned on; when the switching module 200 is turned off, the first diode D1 and the third diode D3 are turned on, the second diode D2 is turned off, the supply voltage is equal to a voltage of the first capacitor C1 minus a turned-on voltage of the third diode D3, or the supply voltage is equal to a voltage of the second capacitor C2 minus a turned-on voltage of the first diode D1.

Specifically, when the switching module 200 is turned on, a positive end of the load 400 connects to the power supply voltage VCC, a negative end of the load 400 connects to the ground GND, the second diode D2 is turned on, the first diode D1 and the third diode D3 are turned off, the first capacitor C1, the second capacitor C2 and the second diode D2 are connected in series to the power supply voltage VCC, the first capacitor C1 and the second capacitor C2 are charged in series. When the switching module 200 is turned off, the first diode D1 and the third diode D3 are turned on, the second diode D2 is turned off, the first capacitor C1 and the third diode D3 are connected in series, the second capacitor C2 and the first diode D1 are connected in series, before being connected in parallel to discharge the load 400, providing the supply voltage for the load 400.

During an operation of an entire circuit, the first capacitor C1 and the second capacitor C2 are charged in series, and discharged in parallel, due to a small and negligible conduction voltage of the first diode D1, the second diode D2 and third diode D3, thus the supply voltage provided by the half-voltage generating module 300 to the load 400 is half of the power supply voltage VCC, and the load 400 may demodulate the control signal from the power supply voltage VCC and the supply voltage.

Continue referencing to FIG. 4, in a further implementation of an embodiment, the switching module 200 comprises a first switching transistor M1, a first end of the first switching transistor M1 connects to the control module 100, a second end of the first switching transistor M1 connects to the power supply line, and a third end of the first switching transistor M1 connects to the half-voltage generating module 300 and the load 400, respectively.

Specifically, the first switching transistor M1 may be a P-type MOS transistor, a drain of the P-type MOS transistor connects to the power supply line, a source of the P-type MOS transistor connects to the half-voltage control module 100 and the load 400, respectively, and a gate of the P-type MOS transistor connects to the control unit MCU. The control signal output by the control unit MCU modulates an output of the power supply voltage through the gate of the P-type MOS transistor, the power supply voltage VCC is supplied by an external power supply and input to the drain of the P-type MOS transistor through the power supply line. When the P-type MOS transistor is turned on, the load 400 receives the power supply voltage VCC (a positive pulse carrier signal), when the P-type MOS transistor is turned off, the load 400 receives the supply voltage (a negative pulsed carrier signal) output by the half-voltage generating module 300, wherein a pulse width of the power supply voltage VCC is relatively long and a pulse width of the supply voltage is relatively short, thus a period for charging the first capacitor C1 and the second capacitor C2 connected in series will be relatively long, while a period for discharging the first capacitor C1 and the second capacitor C2 connected in parallel will be relatively short, so that it is possible to power the load 400 by the half-voltage generating module 300 when the P-type MOS transistor is turned off.

Figure 5:
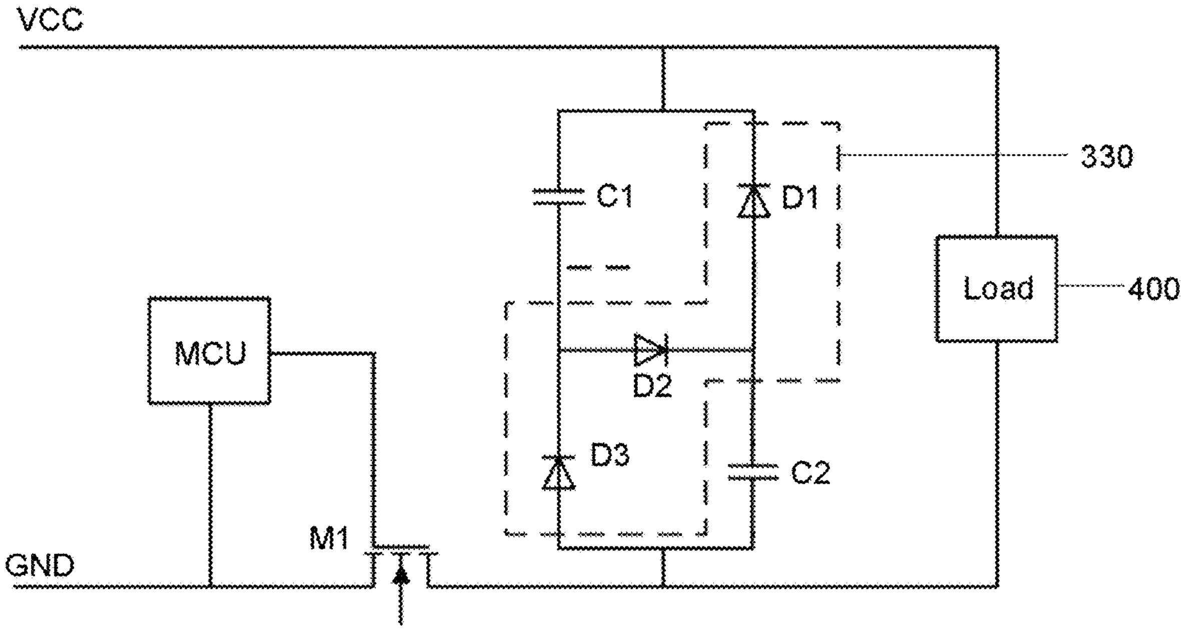
FIG. 5 illustrates a schematic circuit diagram on the driving circuit for the power supply line carrier in another embodiment of the present application.

Referencing to FIG. 5, in a plurality of embodiments, the first switching transistor M1 may also be an N-type MOS transistor, a gate of the N-type MOS transistor connects to the control unit MCU, a drain of the N-type MOS transistor connects to the ground, and a source of the N-type MOS transistor connects to the negative end of the load 400, which operates on a same principle as the P-type MOS transistor, thus no more details are stated herein.

It shall be noted here, since the first capacitor C1 and the second capacitor C2 are energy storage elements, a power consumption thereof is negligible, while a forward conduction voltage of the first diode D1, the second diode D2, and the third diode D3 is relatively small, and correspondingly a useless power consumption is also relatively small, thus the driving circuit will not generate the heat generation problem during operating.

For a better understanding of the present application, an LED light string is taken as the load 400 to describe the present application hereafter. Wherein the LED light string comprises at least one lamp point, each lamp point in the LED light string may be connected in a relationship of parallel, series or series-parallel, the LED light string controls a color and brightness of the lamp point in accordance with the control signal.

Figure 6:
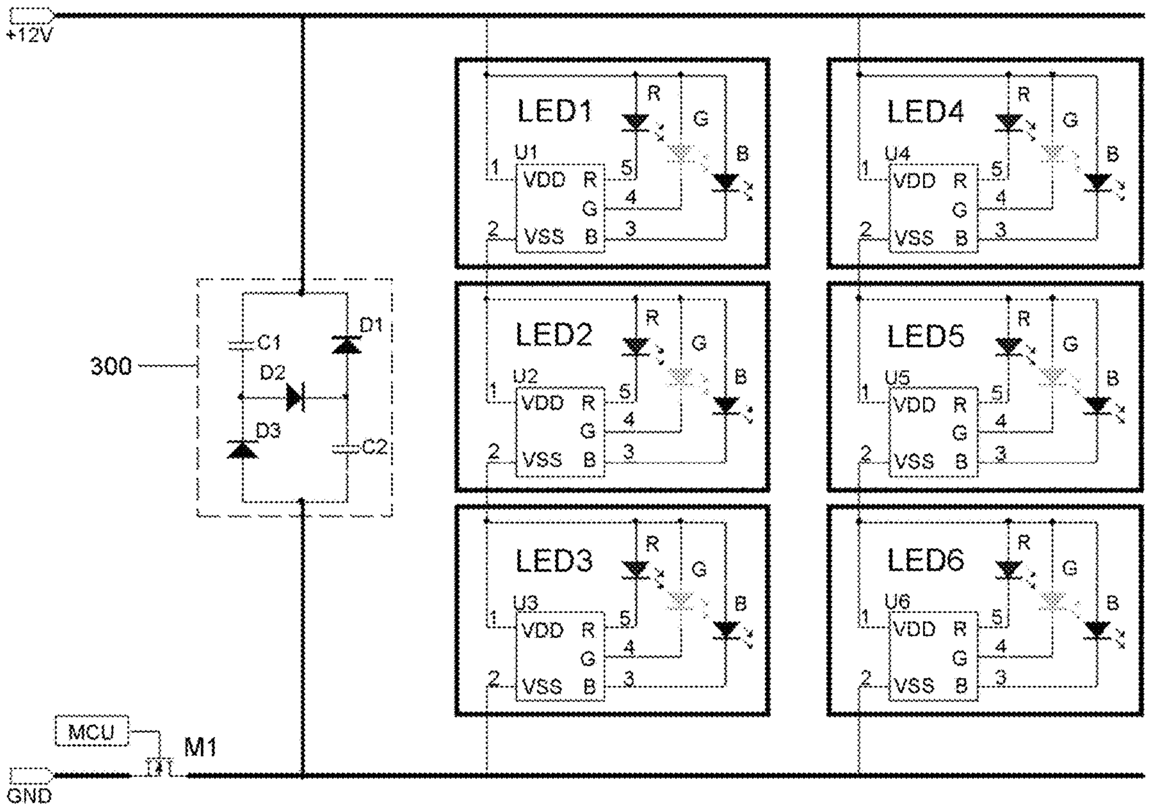
FIG. 6 illustrates a schematic circuit diagram on the driving circuit for the power supply line carrier driving a load of an LED light string having 3 lamp points connected in series into a string while 2 strings connected in parallel in the present application.

Embodiment 1, referencing to FIG. 6, the power supply line supplies a 12V power supply voltage to drive 6 LED lamp points (the 6 LED lamp points are connected in a way of 3 LED lamp points are connected in series into a string while 2 strings are connected in parallel), wherein each LED lamp point comprises three colors of RGB.

Shown as FIG. 6, each LED lamp point has an address number built in, such as LED1 has an address number of 1, LED2 has an address number of 2, LED3 has an address number of 3, LED4 has an address number of 4, LED5 has an address number of 5, and LED6 has an address number of 6. The control unit MCU generates and outputs a control signal (the control signal for the LED lamp point), and modulates the power supply voltage for output through the gate of the first switching transistor M1 (an N-type MOS transistor).

When the first switching transistor M1 is turned on, the power supply line outputs a voltage of 12V, the first diode D1 and the third diode D3 are turned off in reverse, the second diode D2 is turned on, the first capacitor C1 and the second capacitor C2 are connected in series and each charged to 6V (the second diode D2 has a relatively small turned-on voltage thus being negligible), LED1, LED2, LED3 are connected in series to 12V. Since each LED lamp point has a clamping function, and all clamp voltages are set to 4V, that equals to each LED lamp point having an operation voltage of 4V, and each current of the LED1, LED2, LED3 is a same, a built-in chip (the LED lamp point is composed by a control chip and an LED chip) controls a flow direction of the current based on a power carrier signal being received, the current flowing from a channel of a RGB lamp bead will light up the RGB lamp bead, and control the color and brightness of the RGB lamp bead, while excess current will flow through an inside of the chip.

When the first switching transistor M1 is turned off, due to a load 400 effect of two circuits of the LED1, LED2, LED3 and LED4, LED5, LED6 connected in series, a voltage on a positive power supply line and a negative power supply line will be pulled down until the first diode D1 and the third diode D3 are turned on, the second diode D2 is turned off in reverse, the first capacitor C1 and the second capacitor C2 become being connected in parallel before powering the positive power supply line and the negative power supply line, now a voltage on the power supply lines is 6V (a charging voltage when the first capacitor C1 and the second capacitor C2 are connected in series). Since a static voltammetric characteristic of each LED lamp point is a same, when each LED lamp point is operated at a low voltage (implemented by a chip function), thus a voltage of each LED lamp point is 2V.

When the first switching transistor M1 is turned on again, the voltage on the power supply lines returns back to 12V and the voltage of each LED lamp point returns back to 4V. In this way, each time the control unit MCU turns the first switching transistor M1 on=>off=>on, a negative pulse changed from 12V to 6V will occur on the power supply lines, the built-in chip in each LED lamp point will receive a negative pulse changed from 4V to 2V, by such a method of negative pulse power supply carrier modulation, the control unit MCU will then be able to send control information of all LED lamp points to each lamp point sequentially, the built-in chip of the LED lamp point receives the control information for the lamp point from a corresponding location of the control signal according to an address sequence code thereof, before being demodulated and applied to controlling a color and brightness of a RGB lamp bead thereof, that is, each lamp point is able to acquire the lamp point control signal from the corresponding location of the control signal according to a build-in address sequence code thereof, before controlling the color and brightness according to the lamp point control signal. In such a way, one control unit MCU has achieved a single point single control operation to all the LED lamp points through the power supply line, that is, by the control signal, it is able to control each LED lamp point in the LED light string.

Embodiment 2, referencing to FIG. 7, the power supply line supplies a 5V power supply voltage to drive 3 LED lamp points (all are connected in parallel), wherein each LED lamp point comprises three colors of RGB.

Shown as FIG. 7, similarly, each LED lamp point has an address number built in, such as LED1 has an address number of 1, LED2 has an address number of 2, and LED3 has an address number of 3.

When the first switching transistor M1 is turned on, the power supply line outputs a voltage of 5V, the first capacitor C1 and the second capacitor C2 are each charged in series to 2.5V, the LED1, LED2, LED3 are connected in parallel to 5V. The built-in chip controls a current of the RGB lamp bead according to the power supply carrier signal being received, so as to control the color and brightness of the RGB lamp bead.

When the first switching transistor M1 is turned off, due to the load 400 effect of the LED1, LED2 and LED3, the voltage on the positive supply line and the negative supply line will be pulled down to 2.5V (the charging voltage when the first capacitor C1, the second capacitor C2 are connected in series), now the voltage of each LED lamp point is 2.5V.

When the first switching transistor M1 is turned on again, the voltage of each LED lamp point returns back to 5V again. In such a way, each time the control unit MCU turns the first switching transistor M1 on=>off=>on, a negative pulse changed from 5V to 2.5V will occur on the power supply line, the built-in chip in each LED lamp point will receive a negative pulse changed from 5V to 2.5V. By such a method of negative pulse power supply carrier modulation, the control unit MCU will then be able to send the control information of all LED lamp points to each lamp point sequentially, the built-in chip of the LED lamp point receives the control information for the lamp point from a corresponding location of the control signal according to an address sequence code thereof, before being demodulated and applied to controlling the color and brightness of a RGB lamp bead thereof.

Figure 8:
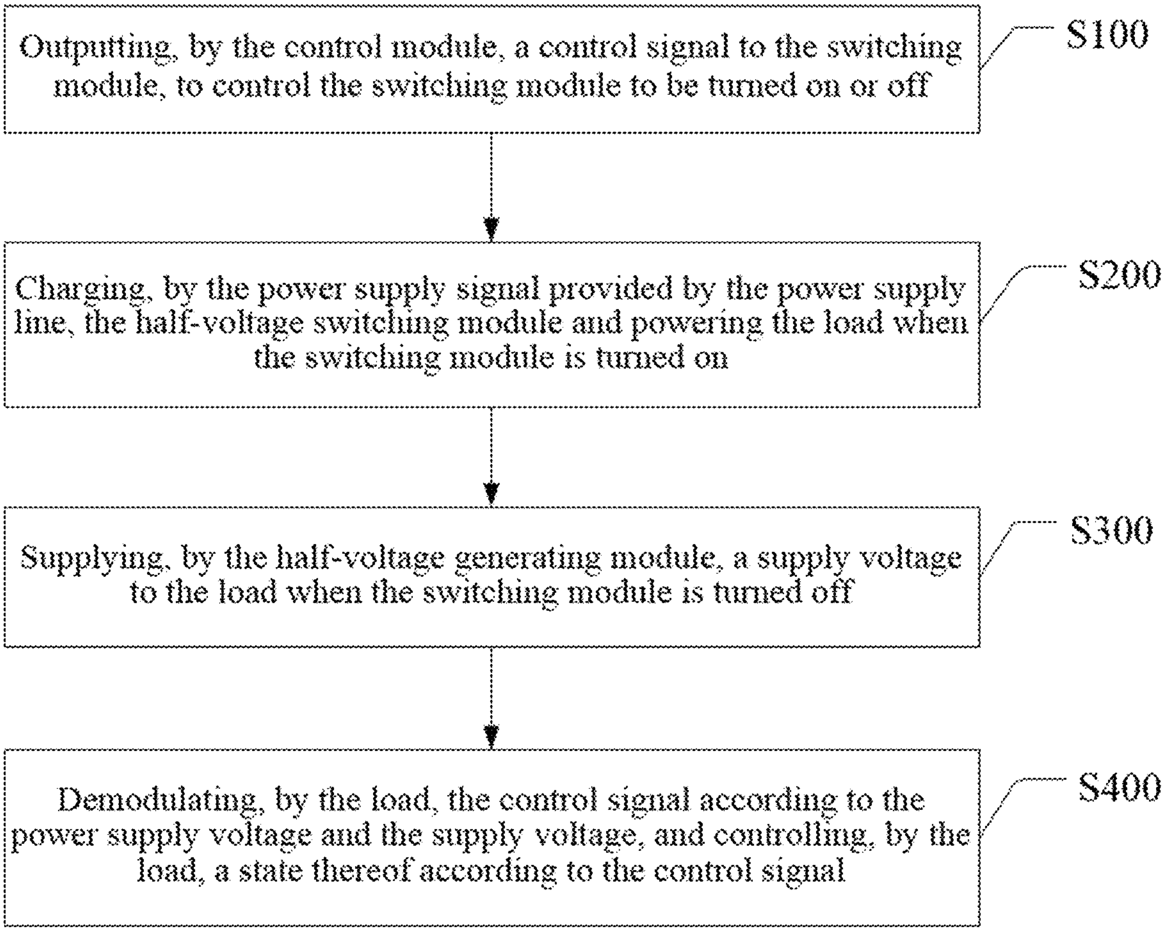
FIG. 8 illustrates a schematic flow diagram on the driving method for the power supply line carrier in the present application.

Referencing to FIG. 8, in a plurality of embodiments, the present application further provides a driving method applied to the driving circuit for the power supply line carrier stated above, wherein comprising:

S100, outputting, by the control module, a control signal to the switching module, to control the switching module to be turned on or off; a detailed solution has been described as in the embodiment of the driving circuit for the power supply line carrier, thus no more details are stated herein.

S200, charging, by the power supply signal provided by the power supply line, the half-voltage switching module and powering the load when the switching module is turned on; a detailed solution has been described as in the embodiment of the driving circuit for the power supply line carrier, thus no more details are stated herein.

S300, supplying, by the half-voltage generating module, a supply voltage to the load when the switching module is turned off; a detailed solution has been described as in the embodiment of the driving circuit for the power supply line carrier, thus no more details are stated herein.

S400, demodulating, by the load, the control signal according to the power supply voltage and the supply voltage, and controlling, by the load, a state thereof according to the control signal. A detailed solution has been described as in the embodiment of the driving circuit for the power supply line carrier, thus no more details are stated herein.

In a plurality of embodiments, the load may be an LED light string, the LED light string comprises at least one lamp point, the LED light string controls a color and brightness of the lamp point according to the control signal; wherein, the control module sends out control information for each lamp point in a sequence through the control signal, each of the lamp points acquires a lamp point control signal from a corresponding location of the control signal according to a built-in address sequence thereof and controls the color and brightness according to the lamp point control signal. A detail has been described as in the embodiment of the driving circuit for the power supply line carrier, thus no more details are stated herein.

All above, the present application provides a driving circuit for the power supply line carrier and a driving method thereof, wherein the driving circuit for the power supply line carrier is applied to driving a load operating, outputs a control signal to the switching module through the control module, so as to control the switching module to be turned on or off. When the switching module is turned on, the power supply signal provided by the power supply line charges the half-voltage generating module and powers the load; when the switching module is turned off, the half-voltage generating module provides a supply voltage to the load, the load demodulates the control signal according to the power supply voltage and the supply voltage, and controls a state thereof according to the control signal. It can be seen that, the present application powers the load through the half-voltage generating module when the switching module is powered off, without needing to adopt a dividing resistor and a regulator transistor to generate the low voltage required, or a DC-DC step-down circuit to generate the low voltage required, having little useless power consumption, and a higher power supply utilization, avoiding a heating issue on a driving circuit, having a simple circuit and reducing cost.

It should be understood that, the application of the present application is not limited to the above embodiments listed. Ordinary technical personnel in this field can improve or change the applications according to the above descriptions, all of these improvements and transforms should belong to the scope of protection in the appended claims of the present application.

What is claimed is:

1. A driving circuit for power supply line carrier, applied to driving a load operating, comprising: a control module, a switching module and a half-voltage generating module, wherein the control module connects to the switching module, the control module is applied to outputting a control signal to the switching module, so as to control the switching module to be turned on or off, wherein the switching module connects with a power supply line, the half-voltage generating module and the load respectively, the switching module is applied to, when being turned on, charging the half-voltage generating module with a power supply voltage provided by the power supply line and outputting the power supply voltage to the load and to terminate the power supply voltage to the half-voltage generating module when being turned off, and;

wherein the half-voltage generating module further connects to the load, the half-voltage generating module is applied to providing a supply voltage to the load when the switching module is turned off, the load demodulates the control signal according to the power supply voltage and the supply voltage before controlling a state thereof according to the control signal, wherein the half-voltage generating module comprises: a first energy storage unit, a second energy storage unit and a charging-and-discharging control, wherein the first energy storage unit connects to the switching module, the charging-and-discharging control unit and the load, respectively, wherein the second energy storage unit connects to the charging-and-discharging control unit and the load, respectively, and wherein the charging-and-discharging control unit is applied to controlling the first energy storage unit and the second energy storage unit to be charged in series, and applied to controlling the first energy storage unit and the second energy storage unit to be discharged in parallel.

2. The driving circuit for power supply line carrier according to claim 1, wherein the first energy storage unit comprises: a first capacitor, one end of the first capacitor connects to the switching module, the charging-and-discharging control unit and the load, respectively; another end of the first capacitor connects to the charging-and-discharging control unit.

3. The driving circuit for power supply line carrier according to claim 2, wherein the second energy storage unit comprises: a second capacitor, one end of the second capacitor connects to the charging-and-discharging control unit, another end of the second capacitor connects to the charging-and-discharging control unit and the load, respectively.

4. The driving circuit for power supply line carrier according to claim 3, wherein the charging-and-discharging control unit comprises: a first diode, a second diode, and a third diode, wherein a negative electrode of the first diode connects to the switching module, one end of the first capacitor, and the load, respectively, while a positive electrode of the first diode connects to a negative electrode of the second diode and one end of the second capacitor, respectively, wherein a positive electrode of the second diode connects to another end of the first capacitor and a negative electrode of the third diode, respectively, wherein the negative electrode of the second diode further connects to one end of the second capacitor;

wherein a positive electrode of the third diode connects to another end of the second capacitor, wherein a voltage of the first capacitor is equal to a voltage of the second capacitor when the switching module is turned on; the voltage of the first capacitor is equal to half of a difference of the power supply voltage minus a turned-on voltage of the second diode, when the switching module is turned on, and wherein when the switching module is turned off, the first diode and the third diode are turned on, the second diode is turned off, the supply voltage is equal to the voltage of the first capacitor minus a turned-on voltage of the third diode, or the supply voltage is equal to the voltage of the second capacitor minus a turned-on voltage of the first diode.

5. The driving circuit for power supply line carrier according to claim 1, wherein the switching module comprises: a first switching transistor, a first end of the first switching transistor connects to the control module, a second end of the first switching transistor connects to the power supply line, and a third end of the first switching transistor connects to the half-voltage generating module and the load, respectively.

6. The driving circuit for power supply line carrier according to claim 1, wherein the load is an LED light string, the LED light string comprises at least one lamp point, the LED light string controls a color and brightness of the lamp point according to the control signal.

7. The driving circuit for power supply line carrier according to claim 6, wherein the control module sends out control information for each lamp point in a sequence through the control signal, each of the lamp points acquires a lamp point control signal from a corresponding location of the control signal in a built-in address sequence thereof and controls the color and brightness according to the lamp point control signal.

8. A driving method applied to the driving circuit for the power supply line carrier according to claim 1, wherein the control module outputs the control signal to the switching module, so as to control the switching module to be turned on or off, wherein when the switching module is turned on, the power supply signal provided by the power supply line charges the half-voltage switching module and powers the load, wherein when the switching module is turned off, the half-voltage generating module supplies a supply voltage to the load, and wherein the load demodulates the control signal according to the power supply voltage and the supply voltage, and controls a state thereof according to the control signal.

9. The driving method according to claim 8, wherein the load is an LED light string, the LED light string comprises at least one lamp point, the LED light string controls a color and brightness of the lamp point according to the control signal, and;

wherein the control module sends out control information for each lamp point in a sequence through the control signal, each of the lamp points acquires a lamp point control signal from a corresponding location of the control signal in a built-in address sequence thereof and controls the color and brightness according to the lamp point control signal.

* * * * *